United States Patent [19]

Pursell

[11] Patent Number: 4,771,151

[45] Date of Patent: Sep. 13, 1988

[54] SELF-HEATING LID FOR SOLDERING TO A BOX

[75] Inventor: Steve Pursell, Menlo Park, Calif.

[73] Assignee: Metcal, Inc., Menlo Park, Calif.

[21] Appl. No.: 658,231

[22] Filed: Oct. 5, 1984

[51] Int. Cl.[4] ............................................. H05B 6/10
[52] U.S. Cl. .................................. 219/10.53; 219/10.57; 219/9.5; 219/10.75; 219/535; 156/69; 156/380.2; 220/359
[58] Field of Search ................... 219/10.53, 10.43, 9.5, 219/10.57, 535, 545, 10.75, 85 R, 85 A; 156/69, 272.2, 272.4, 273.9, 274.2, 379.6, 379.7, 380.2, 380.9; 220/359

[56] References Cited

U.S. PATENT DOCUMENTS

| | | | |
|---|---|---|---|
| 1,369,919 | 3/1921 | Eliel | 219/243 X |
| 2,393,541 | 1/1946 | Kohler. | |
| 2,542,702 | 2/1951 | Prow | 156/379.7 X |
| 2,598,629 | 5/1952 | Whyte | 156/272.2 X |
| 2,642,911 | 6/1953 | De Shazor, Jr. | 156/272.2 |
| 3,450,856 | 6/1969 | Buck et al. | 219/10.53 |
| 3,693,239 | 9/1972 | Dix. | |
| 3,706,176 | 12/1972 | Leatherman | 219/10.53 X |
| 3,723,212 | 3/1973 | Casper | 156/272.4 |
| 3,725,630 | 4/1973 | Gagliardi | 219/10.53 X |
| 3,988,185 | 10/1976 | Johnson et al. | 219/10.53 X |
| 4,091,813 | 5/1978 | Shaw et al. | 219/233 X |
| 4,256,945 | 3/1981 | Carter et al. | 219/10.75 |

FOREIGN PATENT DOCUMENTS

| | | |
|---|---|---|
| 1410433 | 8/1965 | France. |
| 2534108 | 4/1984 | France. |
| 8315739 | 4/1984 | France. |
| 58-42258 | 3/1983 | Japan. |
| WO80/02124 | 10/1980 | PCT Int'l Appl.. |
| WO85/00263 | 1/1985 | PCT Int'l Appl.. |

OTHER PUBLICATIONS

I.E.E.E. Spectrum, vol. 21, No. 4, Apr. 1984, p. 17, "Innovations, Patents, Processes and Products", Smart Heat Sources.
Article, "Gold Based Alloys".

*Primary Examiner*—Philip H. Leung
*Attorney, Agent, or Firm*—Hall, Myers & Rose

[57] ABSTRACT

A lid to be bonded to provide a hermetic seal has bonded thereto a thermally autoregulating heater for activating a heat activated sealing and bonding material to produce the desired seal between the lid and box wherein the temperature is regulated to produce heat in a range that does not change delicate objects that may be heated in the box and wherein the energizing element of the heater may be removed or replaced at will.

18 Claims, 2 Drawing Sheets

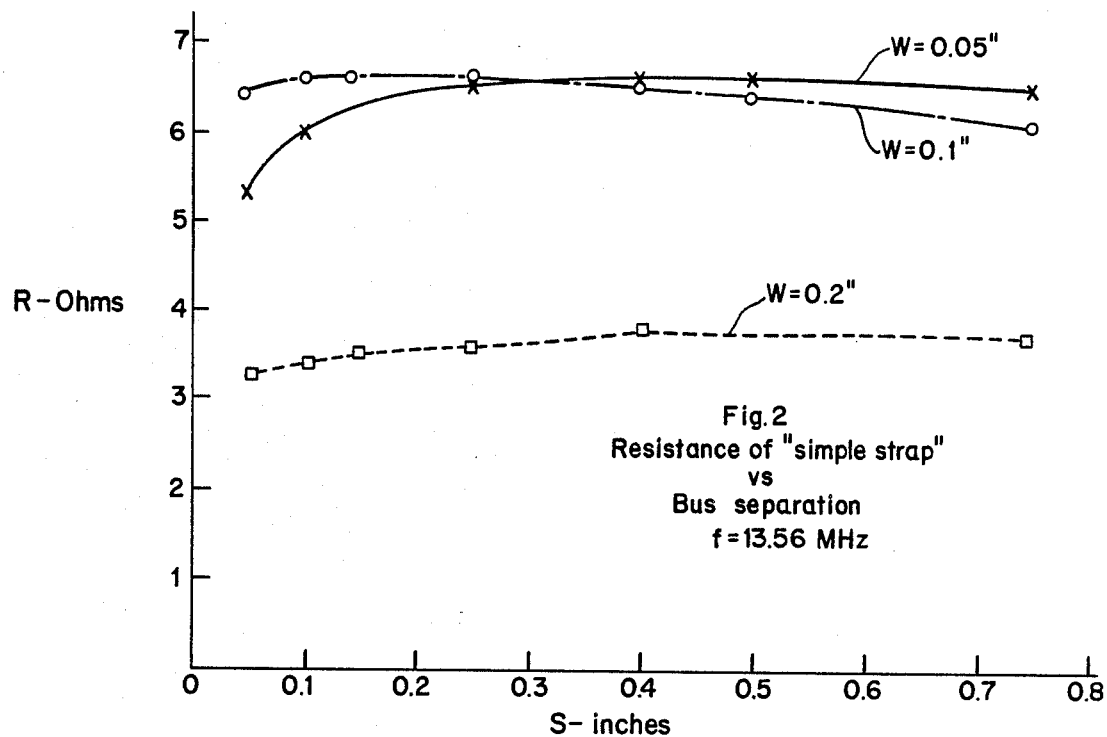
Fig. 6
Fig. 2
Resistance of "simple strap"
vs
Bus separation
f=13.56 MHz
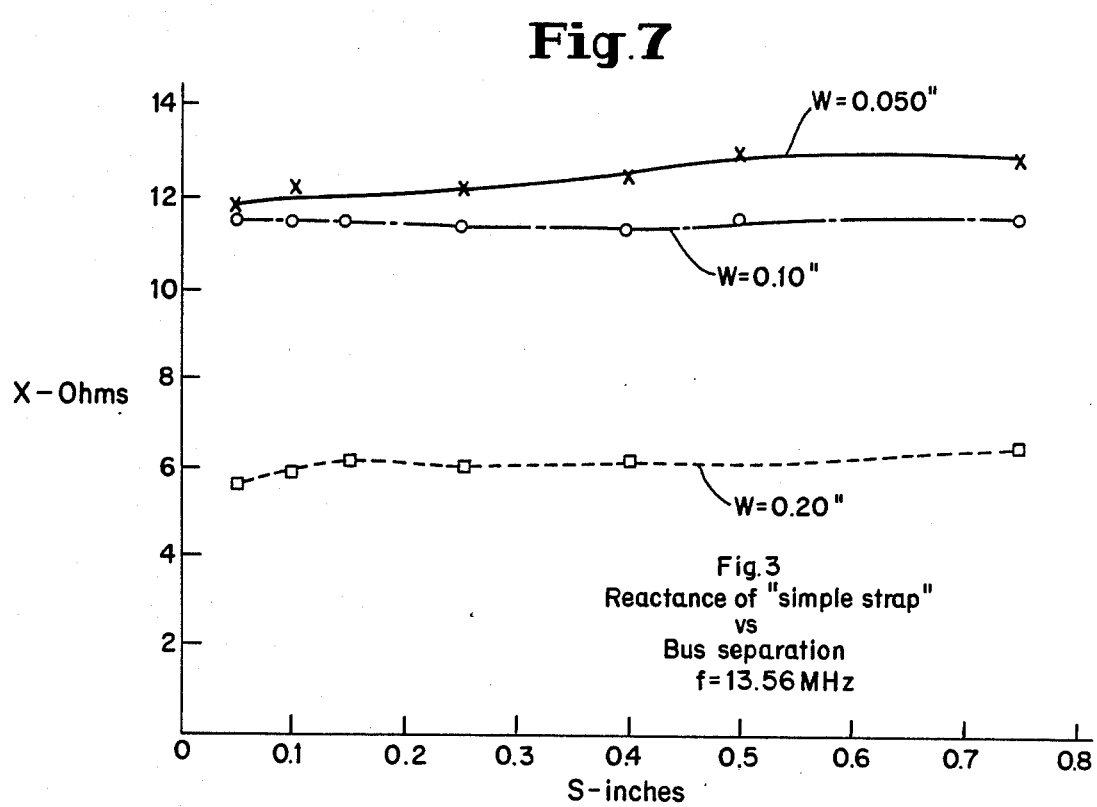
Fig. 7
Fig. 3
Reactance of "simple strap"
vs
Bus separation
f=13.56 MHz

SELF-HEATING LID FOR SOLDERING TO A BOX

BACKGROUND OF THE INVENTION

The present invention relates to securing lids on boxes and more particularly to the use of a specific type of temperature autoregulating heater attached to the lid of the box for heating the lid and thermally activating a sealant disposed between the lid and the vertical on end walls of the box.

The present invention is described as applied to a specific prior art problem but it should be recognized that the teachings relating to attaching lids, sidewalls, bottoms, etc. to a closure are universal in applicability and are described as applied to a particular problem as that problem led to the present invention.

The microwave segment of the electronic industry has grown very rapidly in recent years. The circuits themselve are typically located in small, hermetically sealed boxes. The boxes typically have one or more cavities full of circuitry and components, each of which has a lid. Lids are attached by means of welding, laser welding, soldering, etc.

Lid attachment and removal is a real cost and expense. No one method is preferred and all methods have drawbacks. The very high dollar value of these boxes leads to a need to reenter boxes for rework. Likewise, as many or most of these boxes are for military/aerospace end use, inspection leads to the need to reenter a box. Obviously, the need to machine off a lid to reenter as is often the case now, is a huge drawback to lid welding. Likewise, laser welding is both a high capital cost and high labor cost process.

Soldered lids have their drawbacks. A major drawback has been the flux/contaminant issue. More critical has been the inability to heat the lid contact area uniformly and all at the same time. Soldering irons obviously cannot do the job so that most lids are soldered on in ovens. This method has its own drawbacks, including a relatively long high temperature "soak" of the box and its components. Despite this, the relative ease of re entry makes soldered-on lids desirable. Boxes are typically placed on a hot plate for reopening.

There are a large number of lid shapes and dimensions. There are also many different solders used, hence a wide range of soldering temperatures. Boxes are typically aluminum, plated with tin or gold. Lids are made of aluminum, Kovar, etc., and are also plated.

The present invention utilizes temperature autoregulating heaters which may be any one of the types disclosed in U.S. Pat. No. 4,256,945 to Carter et al, and U.S. patent applications Nos. 586,712, filed Mar. 6, 1984, now U.S. Pat. No. 4,695,715 and Ser. No. 623,238, filed June 21, 1984 which are in the names of Paul Busch and Rodney L. Derbyshire, respectively, a U.S. Patent Application filed concurrently as a CIP application to Ser. No. 623,238 for THIN, FLEXIBLE, AUTOREGULATING STRAP HEATER, the disclosure of which is incorporated herein by reference.

The aforesaid U.S. Pat. No. 4,256,945 discloses an autoregulating heater comprising a layer of magnetic material coated on a conductive layer such as copper. A further or return conductor is disposed adjacent the magnetic layer and insulated therefrom except at an end of each where the two are connected together. The other ends of the return conductor and the magnetic material are connected across a constant current a.c. source, preferably though not necessarily a source in the range of 8 MHz to 20 MHz.2

In operation, below the Curie point of the magnetic metal, the current due to skin effect and the proximity effect of electrical systems, is essentially confined to the magnetic material, i.e. the material adjacent the return conductor. As the temperature of the device approaches the Curie temperature and the permeability of the magnetic material approaches, the current spreads into the copper and the resistance of the heater is reduced. Since current is constant, the Joule heating is greatly reduced, and subsequently the magnetic material falls below its Curie temperature and the cycle repeats. Thus the heater is autoregulating.

Variations of some of the details of the basic design of the aforesaid heater are disclosed in the aforesaid U.S. applications Ser. Nos. 586,712 and 623,238 and a concurrently filed C-I-P application to Ser. No. 623,238, and these designs may also be employed herein although only the embodiment described above is described herein for purposes of brevity.

The concurrently filed application discloses a heater of the above type which is virtually massless and in which the equivalent of the return conductor and the insulation between the return conductor and the magnetic material may be removed.

RELATED APPLICATIONS

This application is related to pending application, Ser. No. 623,238, filed June 21, 1984 and a concurrently filed CIP application which is incorporated by reference. This application is also related to a concurrently filed application of Rodney L. Derbyshire for a Self-Heating Gasket For Hermetically Sealing A Lid To A Box now U.S. Pat. No. 4,665,309.

SUMMARY OF THE INVENTION

In accordance with the present invention a heater structure including at least the magnetic material as disclosed in said patent is preferably permanently bonded to the top surface of the lid. The return conductor or its equivalent as hereinafter explained is secured to a layer of insulation having a tacky substance on its surface remote from the return conductor. Thus, the insulation may be "stuck" to the magnetic material and the heater energized. After the lid is secured, the insulation and return conductor may be removed leaving behind the heater structure. When reentry is desired a return conductor and insulation array is simply reapplied to this heater structure on the lid, the heater activated and the lid removed.

It should be noted that the exposed edges of the main structure, i.e. the box, which are to receive the lid may conveniently have concave longitudinal grooves to hold solder or the like. Thus when the lid is applied and heated, the solder liquifies and lid attachment is completed. Two approaches to the solder may be employed. The solder may be placed in the groove and the box heated to melt the solder and bond it to the box before any components are placed in the box. This approach has the merit that excellent thermal conduction between the solder and the box during application of the lid is assured from the very beginning thereby reducing the heating time required to obviate a cold solder connection.

The second approach to the solder is that a solder preform, solder wire, or liquid solder is laid in the groove and melted upon heating. Heating takes longer but the merit to this approach is the elimination of the extra heating step.

The basic benefit to be realized by the use of the aforesaid heater is that the maximum temperature to which the box with its delicate components is heated can be made not to exceed a safe temperature of the internal components and in addition unlike prior hot plate or oven approaches the entire box is not heated, only the edges contacting the lid.

In consequence of the above invention, the lids for hermetically sealed boxes may be applied in such a manner that the delicate internal circuit(s) is not and in fact cannot be damaged and importantly the lid may be removed and reapplied at anytime, again without fear of damaging delicate circuit components.

BRIEF DESCRIPTION OF THE DRAWINGS

FIG. 6 is a graph plotting resistance of a U-shaped energizing circuit i.e. conductor, as a function of conductor width and separation of the lip of the U.

FIG. 7 is a graph plotting inductance of a U-shaped energizing circuit i.e. conductor, as a function of conductor width and separation of the lip of the U.

DETAILED DESCRIPTION OF THE DRAWINGS

Figure 1:
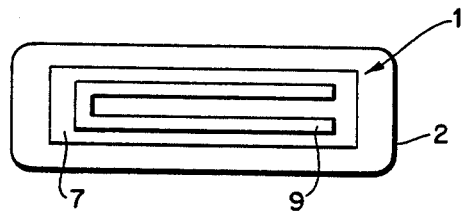
FIG. 1 is a top view of a first embodiment of the present invention.
Figure 2:
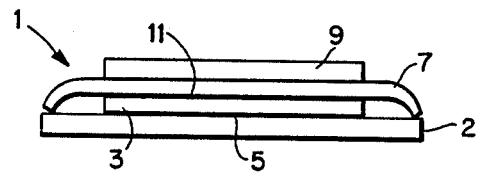
FIG. 2 is a side view of the embodiment of FIG. 1.

Referring now specifically to FIGS. 1 and 2 of the accompanying drawings, there is illustrated one embodiment of a lid and heater 1 according to the present invention. A lid 2 has secured thereto a magnetic material 3. The securing substance, which is designated by reference numeral 5, as desired, may permanently or temporarily bond the material 3 to the lid. If the bonding is to be permanent a high temperature solder or brazing material may be used; it being required that the fusion temperature of such material be well above the fusion temperature of the material attaching the lid to the box.

To complete the structure, an insulating tape 7 having a U-shaped conductor 9, preferably of copper, attached to one surface, is adhered to the magnetic material by a tacky material 11 formed on a surface opposite the U-shaped conductor 9.

In the present embodiment, the material of the lid serves as the conductor into which current spreads when Curie temperature is approached and thus a separate conductive layer is not required. This embodiment is particularly applicable when the lid is copper or a material having a quite low resistivity whereby a quite high auto-regulating ratio is available.

Figure 3:
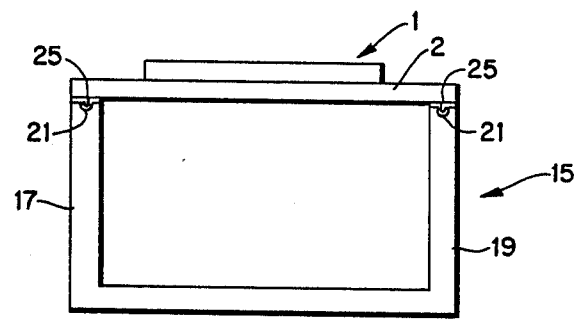
FIG. 3 is a sectional view of the lid of FIGS. 1 and 2 applied to a box.

Referring now specifically to FIG. 3 of the accompanying drawings, there is illustrated, the lid 2 applied to a box 15 prior to sealing of the lid to box 15. Walls 17 and 19 of the lid 2 have, in their upper edges as viewed in FIG. 3 a groove 21 to receive solder 25 or the like. As previously indicated, the solder may be pre-applied and bonded to the walls or may be a solder preform, solder paste or wire laid in the grooves. In either event, the solder must extend above the walls to ensure good contact with the lid. Upon heating of the lid, the solder melts, transfers sufficient heat to the upper regions of the walls 17 and 19 to insure wetting of the walls by the solder and upon termination of heating results in excellent bond between the members.

It should be noted that if the solder is to be applied to the walls prior to application of the lid, the groove 21 may be eliminated; however, some trouble may be encountered in subsequent removals and reapplications of the lids when some solder has been removed and the grooves are not available to receive solder wire or paste.

Figure 4:
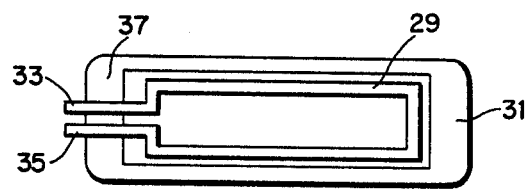
FIG. 4 is a top view of a preferred embodiment of the present invention.

Referring now specifically to FIG. 4 of the accompanying drawings, there is illustrated a second embodiment of the present invention. In this embodiment of the invention energizing conductor 29 follows closely the outer periphery of a lid 31 and has extensions 33 and 35 of each end of the conductor 29 extending well beyond the lid 31. These extensions serve two purposes; they permit ready connection of a power supply to the conductor 29 and they provide a tab, together with an overlying insulation layer 37, to pull the conductor off the lid.

Figure 5:
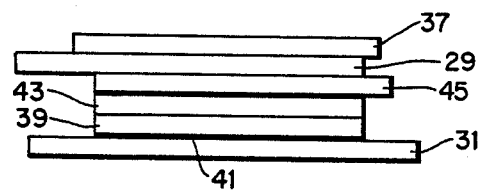
FIG. 5 is a side view of the one realization of the embodiment of FIG. 4.

FIG. 5 illustrates in elevation one realization of the heater of FIG. 4. A layer 39 of highly conductive material, such as copper, is secured, permanently or otherwise, to lid 31 by a bonding agent 41. The copper layer is covered with a thin layer 43 of magnetic material having a prescribed Curie temperature. The magnetic material is covered with insulating layer 45 which may be permanently or temporarily (usually temporarily when the tabs 33 and 35 are provided) bonded to the magnetic 43.

The devices of FIGS. 4 and 5 together have the advantage over that of FIGS. 1 and 2 in that the heat is concentrated in the region under which the solder is located thus increasing the speed at which the operation may be performed and further decreasing the heat conducted to delicate electronic components.

In preliminary tests performed on the structure of FIG. 1, in one case and the other with such structure modified as in FIG. 5 to include a copper layer between the magnetic material and the lid, two lids were tested with different magnetic materials. The unmodified lid of FIG. 1 employed Metglas Alloy 2714A having a Curie temperature of 220° C. The other or modified lid employed was TC32 alloy clad on copper. It has a Curie temperature of 150° C. The heaters were secured to lids made of aluminum plated with tin. The lids weighed 2.38 grams and were 0.032 inch thick and tinned all over. The box to which the lids were to be attached weighed 33.5 grams. The heaters were operated at 50, 80 and 100 watts and the Metglas heater was also and in addition at 30 and 150 watts.

The heater performed properly, but the Curie temperature of the TC32 alloy was too low and soldering could not be affected. On the other hand, the Metglas lid affected soldering but the lid became somewhat hotter than desired for this particular solder. TC33 has the desired temperature. Thermal contact between the lid and box was found to be quite good even in the absence of solder. However, the boxes heat up slowly so that 100-150 watts is the proper range of operation of the heater; such input power heating the system to the requisite temperature in approximately 20 seconds. The required time is reduced by the structure of FIG. 4 as the heat energy input is concentrated directly over the box which as indicated above heats relatively slowly.

The dimensions of the heater both planar and in depths are defined in prior applications and U.S. Pat. No. 4,256,945, but are briefly reitereated for purposes of conciseness. The magnetic material should be roughly 0.5 to 1.8 times skin depth at the frequency of operation. Skin depth in centimeters is defined by the equation $$S.D. = 5030 \sqrt{\frac{\rho}{f\mu}}$$

when re $\rho$ is the resistivity in ohm-cm of the magnetic material, $\mu_r$ is the permeability of the magnetic material and $f$ is the frequency of the source in $H_z$. In a typical case using Alloy 42, $\mu_r$ 200, $\rho$ is $75 \times 10^{-6}$ ohm-cm and $f$ is 13.56 MHz. Thus skin depth is approximately 0.0008365 cm and the magnetic layer should be approximately 0.0008365 cm thick. The underlying layer should be about 5 skin depths at a $\mu_r$ of 1 and a $\rho = 2 \times 10^{-6}$ ohm cm to provide low resistance current carrying capacity above Curie temperature and to insure adequate shielding of the magnetic field to the outside world. In this context, se the copending patent application of Carter et al, Ser. No. 243,777, filed Mar. 16, 1981, now U.S. Pat. No. 4,701,587, a C-I-P application of the aforesaid patent. Thus, the underlying layer should be 0.009659 cm.

Additional consideration must be given to the heater structure and in particular to the width to thickness ratio of the magnetic layer. If the magnetic layer is completely surrounded by a conductive layer then the intrinsic permeability of the magnetic material may be realized. If, however, the magnetic layer has exposed edges as in the present application then the intrinsic permeability cannot be realized. The equation for the relationship between intrinsic and effective permeability for a rectangle is extremely complex but can be approximated by the following equation for an ovoid.

$$\mu_E = \mu_I \cdot \frac{1}{1 + \mu_I \left(\frac{t}{w+t}\right)}$$

where $\mu_E$ is effective permeability, $\mu_I$ is intrinsic permeability, t is thickness and w is width. The table below illustrates the effect on both permeability and the w/t ratio on the effective permeability.

| w/t | $\mu_I$ 200 | 400 |
|---|---|---|
| 10 | 10 | 10 |
| 25 | 23 | 24 |
| 50 | 41 | 44 |
| 100 | 67 | 80 |
| 200 | 100 | 133 |
| 300 | 120 | 171 |
| 400 | 133 | 200 |
| 500 | 143 | 227 |
| 1000 | 167 | 286 |

Thus it is seen that the greater the ratio the higher the effective permeability and the lower the intrinsic permeability the higher the ratio of $\mu_E/\mu_I$. For instance, the ratio $\mu_E/\mu_I$ for w/t equal to 1000 is 0.835 for a permeability of 200 but is only 0.715 for a permeability of 400.

There are certain dimensions that must be observed relative to location of the legs of the energizing conductor such as conductor 9 of FIG. 1.

Referring specifically to the graph of FIG. 6, the graph depicts resistance as a function of bus separation, i.e., the separation between legs of the U-shaped construction of FIG. 1 for various widths of the conductor for a bus length of 8 inches. It is seen that above approximately 0.1 inch separation or more, the bus resistance remains essentially constant regardless of conductor width "w." It will be noted that with a conductor width of 0.05", resistance drops materially below separations of 0.2 or less. Thus, if conductor widths of 0.1 or greater and conductor separation of approximately 0.1 or more or conductor spacings of 0.25 inch or more are maintained, relatively high resistances are achieved. Spacing and widths of 0.1 are preferred in most instances providing quite high resistance, i.e., 6 to 6.5 ohms.

The effects of conductor width and separation on the reactive components of impedance are illustrated by the graphs of FIG. 7. Much the same characteristics are present as in the resistive case. A conductor width of 0.05" produces a downward sloping curve, a width of 0.1" produces an essentially flat curve down to separations of about 1.5 inch. with bus lengths of 8 inches. The above dimensions of width and depth are for a 13.56 MHz system having energizing circuit thicknesses of approximately 0.003 inch. The circuits on which these tests were conducted are adapted to deliver 100-150 watts of power under full load.

The term "constant current" as employed herein does not mean a current that cannot increase, but means a current that obeys the following formula:

$$\frac{\Delta |I|}{|I|} > -\frac{1}{2} \frac{\Delta R}{R}$$

where I is the load current, Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is controlled in accordance with the above formula, autoregulation is achieved. Thus, when large autoregulating ratii are not required, constraints on the degree of current control may be relaxed thus reducing the cost of the power supply.

The above equation is derived by analyzing the equation:
$P = |I|^2 R$ where P is power and I is the current in the load.

Differentiating with respect to R $$\frac{dP}{dR} = |I|^2 + 2R|I| \frac{dI}{dR}$$

to satisfy the requirements for autoregulation $$\frac{dP}{dR} > 0.$$

Thus, $$|I|^2 + 2R|I|\left(\frac{d|I|}{dR}\right) > \emptyset,$$

which reduces to the above equation. It should be noted, however, that the more constant the current the better the autoregulation.

Once given the above disclosure, many other features, modifications and improvements will become apparent to the skilled artisan. Such other modifications, features and improvements are, therefore, considered a part of this invention, the scope of which is to be determined by the following claims.

I claim:

1. A member to be secured to another member by means of a heat activated sealant energized by an integral temperature autoregulating heater comprising
   a heat conductive member having a first surface and a second surface,
   a temperature autoregulating heater bonded to said first surface,
   an energizing circuit for said heater removably adhered to said heater, and
   means adapted to connect said energizing circuit to a source of alternating current.

2. The combination according to claim 1 wherein said member is a cover to be hermetically sealed to a box.

3. The combination according to claim 2 wherein said cover is adapted to contact said box along a defined area of said second surface of said cover, and
   wherein said heater is disposed on said first surface of said cover opposite said area on said second surface.

4. The combination according to claim 2 or claim 3 wherein said heater is permanently bonded to said cover.

5. The combination according to claim 2 or claim 3 wherein said energizing circuit is inductively coupled to said heater.

6. The combination according to claim 2 or claim 3 further comprising means for bringing said area of said second surface onto contact with a sealant.

7. The combination according to claim 6 wherein said heater is a magnetic material having a Curie temperature in a range required to activate said thermal activated sealant.

8. In combination, a receptacle and a cover adapted to be adhered to said receptacle in hermetic sealing relation, said combination comprising
   a thermally autoregulating heater secured to a first surface of said cover,
   a heater energizing circuit removably bonded to said heater,
   said cover adapted to contact said receptacle over a specified area of a second surface of said cover,
   a reheatable reflowable sealant disposed between the areas of contact between said cover and said receptacle, and
   means adapted to connect said energizing circuit across a source of alternating current.

9. The combination according to claim 8 wherein said heater is disposed on said first surface of said cover opposite said specified areas of contact.

10. The combination according to claim 8 or claim 9 wherein said heater is permanently secured to said cover.

11. A combination including an open-ended box and a lid to be removably secured over the open end of the box to provide a seal therefor, said combination comprising:
    a lid of electrically conductive material having an outer periphery and opposed generally flat surfaces,
    a box having walls defining edge surfaces approximating the geometry of the outer periphery of said lid,
    one of said surfaces of said lid disposed on said end surfaces of said box,
    a layer of magnetic material adjacent said periphery of and on the other of said surfaces of said lid, and
    means inducing current in said magnetic material sufficient to cause the temperature of said magnetic material to closely approach its Curie temperature.

12. A combination according to claim 11 further including:
    a reheatable sealant disposed between said edge surfaces and said one surface.

13. A closure for a compartment comprising:
    an electrically conductive member having opposed surfaces defining an outer periphery,
    a thin, narrow layer of magnetic material disposed on one of said surfaces contiguous to the entire outer periphery thereof, and
    means adapted to induce currents in said magnetic material to heat it to a temperature adjacent its Curie point;
    said means substantially confining said currents to said magnetic material below said Curie temperature.

14. A closure for a compartment according to claim 13 further comprising:
    an open-ended compartment having edge surfaces of walls defining the opening of the open-ended compartment,
    the edge surfaces defining a geometry substantially the same as the pattern of said magnetic material on said electrically conductive member,
    a heat activated sealant on said edge surfaces,
    said means inducing currents in said magnetic material when said other surface of said member is in contact with said edge surfaces.

15. A closure for a compartment according to claims 13 or 14 wherein
    said means for inducing comprises a magnetic coil.

16. A closure for a compartment according to claim 15 wherein
    said magnetic coil is secured to and insulated from said magnetic material.

17. A closure for an opening comprising:
    a plurality of walls having exposed edges defining an opening to be covered,
    a closure having a first surface of a size and configuration to cover said edges of said walls,
    said closure having a second surface opposed to said first surface,
    a heater disposed on said second surface,
    said first surface of said closure adapted to contact the edges of said walls of said closure,
    said heater geometrically conforming to a narrow region of said second surface opposite the exposed edges defining said opening to be closed, and
    means adapted to permit said heater to be energized.

18. A closure for a compartment according to claims 13 or 14 or 17 wherein
    a sealant is disposed between said lid or closure and a box or compartment to be closed, said sealant being solder.

* * * * *